United States Patent [19]
Aparicio, IV et al.

[11] Patent Number: 5,361,326
[45] Date of Patent: Nov. 1, 1994

[54] ENHANCED INTERFACE FOR A NEURAL NETWORK ENGINE

[75] Inventors: Manuel Aparicio, IV, Arlington; Patrice C. Miller; Wade A. Miller, both of Keller, all of Tex.

[73] Assignee: International Business Machines Corporation, Armonk, N.Y.

[21] Appl. No.: 816,460

[22] Filed: Dec. 31, 1991

[51] Int. Cl.⁵ .............................................. G06F 15/18
[52] U.S. Cl. ........................................ 395/21; 395/22; 395/26; 395/23; 395/76
[58] Field of Search ................................ 395/22, 76

[56] References Cited

U.S. PATENT DOCUMENTS

| | | | |
|---|---|---|---|
| 5,052,043 | 9/1991 | Gaborski | 382/14 |
| 5,111,531 | 5/1992 | Grayson et al. | 395/23 |
| 5,142,665 | 8/1992 | Bigus | 395/21 |
| 5,224,203 | 6/1993 | Skeirik | 395/22 |

OTHER PUBLICATIONS

Nijhuis, et al., "Structure and Application of NNSIM: a General-Purpose Neural Network Simulator," Microprocessing and Microprogramming, Aug. 1989, 189–194.

Hillman, D., "Software Review: Neuroshell v. 3.2," AI Expert, Sep. 1990, 61, 62, 64.

"Neural-Net Resource Guide," AI Expert, Jul. 1991, 60–62, 64–68, 70.

Product Specification for ANSpec, SAIC, Sep. 1991.

*Primary Examiner*—Robert W. Downs
*Attorney, Agent, or Firm*—Whitham, Curtis, Whitham & McGinn

[57] ABSTRACT

An interface for a neural network includes a generalized data translator and a certainty filter in the data path including the neural network for rendering a decision on raw data, possibly from a data processing application. The data translator is controlled with user-definable parameters and procedures contained in a property list in order to manipulate translation, truncation, mapping (including weighting) and other transformations of the raw data. The neuron to which the output of the data translator is applied is controlled by a code index contained in an action list. An external certainty threshold is also provided, preferably by the action list to filter the output of the neural network. The core program used with the ConExNS neurons for system maintenance also includes further core operations and size maintenance operations responsive to commands from the user of an application to cause operations to be performed with in the neural network as well as to create and update the property and action lists.

18 Claims, 5 Drawing Sheets

| LABEL | CODETYPE | # | VALUES | PROCEDURE |
|---|---|---|---|---|
| OPENED | BOOLEAN | 1 | TRUE/FALSE | PREDEFINED |
| NOTE SIZE | NUMBER | 3 | 1-10,11-20,21-50 | PREDEFINED |
| # CARBONS | THERMOMETER | 3 | 1-20,1-50,20-100 | PREDEFINED |
| CLASSIFICATION | CATEGORIES | 3 | MEMO,LETTER,DOCUMENT | PREDEFINED |
| ⋮ | | | ⋮ | |
| SENDER | FEATURE | 2 | MANAGER,CO-WORKER | USER DEFINED |

ENHANCED INTERFACE FOR A NEURAL NETWORK ENGINE

BACKGROUND OF THE INVENTION

Field of the Invention

The present invention generally relates to the field of expert computer systems and computer implemented artificial intelligence and, more particularly, to an interface for facilitating practical implementations of neural networks to enhance particular data processing applications.

CROSS-REFERENCE TO RELATED APPLICATIONS

This application is related to U.S. patent application Ser. No. 07/816,445, entitled LOW-LEVEL BIT INTERFACE TO ConExNS NEURAL NETWORK ENGINE, by Aparicio et al, filed concurrently herewith, and U.S. patent application Ser. No. 07/816,446, entitled OBJECT LAYER INTERFACE TO ConExNS NEURAL NETWORK ENGINE, by Aparicio et al. filed concurrently herewith, both of which are hereby fully incorporated by reference. The inventions disclosed therein will be referred to hereinafter by the terms "low-level bit interface" and "object layer interface", respectively, while the present invention will be referred to as the "interface" or "enhanced interface".

Description of the Prior Art

The field of artificial intelligence and expert systems has been a subject of substantial scholarly interest for at least twenty-five years. Most of such interest has been centered on the development of circuits which have the capacity to simulate a human neuron in its ability to differentially respond to a plurality of inputs and based on previously input combinations of signals, often referred to as input vectors. The response can then be memorized or not, depending on the relationship between the actual output and the desired output.

The design of a neural circuit is certainly not trivial since the number of Boolean states which a circuit must be able to emulate increases dramatically with the number of inputs. It is also very desirable and substantially enhancing of the "learning" process if the circuit can express a degree of certainty and exhibit "fuzzy logic", that is, produce an output based, in part, on inference from different previous input vectors and express a degree of certainty of the output based on the similarity of a current input vector and input vectors previously memorized. The memory requirements must also be kept low and the neural circuit must provide for storage of as few input vectors as possible to support the Boolean state which it eventually expresses after responding to numerous input vectors.

Recently, a neural circuit or "neuron" has been provided which substantially answers all of these requirements and is the subject of U.S. patent application Ser. No. 07/720,278, filed Jun. 24, 1991, entitled *Convolutional Expert Neural System (ConExNS)* by M. Aparicio and S. E. Otto, and assigned to the assignee of the present application, which is hereby fully incorporated by reference herein. Various aspects of that invention, when referred to herein, will be identified by the acronym "ConExNS".

The ConExNS neural circuit described therein has the capacity to be expanded in an orderly and predictable fashion to an arbitrary number of inputs while minimizing required storage and providing all of the above-mentioned desirable attributes of such a circuit. The ConExNS neural circuit also can be economically implemented on a general purpose computer to respond to a wide variety of inputs or stimuli.

Neural networks ideally consist of a massively parallel network of neurons, each capable of accepting an arbitrary number of inputs from a plurality of sources. Inputs from any particular set or subset of sources are collectively referred to as an input vector and a separate neuron must be provided for each response desired based on inputs from any subset of those sources. Therefore, as neural networks are developed from groups of neurons, the task of associating an input from particular ones of these sources with particular inputs of particular neural circuits becomes extremely burdensome.

Further, outputs of sources may be in a variety of forms such as a Boolean expression, a number, a thermometer code, particular discrete values such as names or words or even analog values. These source outputs must often be modified in some way such that the value may be expressed as one or a plurality of binary values. The source output data may also include unnecessary information such as more resolution than is desired to be reflected in the decision made by the neural circuit. Further, the data may be output from the source as a serial bit string or in matrix form which must be converted into parallel form for application to a neuron. At the present state of the art, all of these translations, truncations and other transformations must be individually performed by the user on each value appearing from time to time as a source output of each source or custom data processing provided for each source which could provide an input to the neural network.

SUMMARY OF THE INVENTION

It is therefore an object of the present invention to provide a high level interface to a neural network to allow a user to easily define the nature and parameters of each neuron in a neural network.

It is another object of this invention to provide a high level interface to a neural network which allows arbitrary mapping of source outputs to neuron inputs.

It is a further object of this invention to provide a high level interface to a neural network which allows arbitrary translation or transformation of source output data to one or a plurality of binary signal suitable for being input to a particular neural circuit.

To achieve the above and other objects of the invention, a method and apparatus are provided for interfacing between a data processing application and a neural network including by providing at least one label by said data processing application to an interface arrangement, selecting a neuron of said neural circuit for application of a value of said at least one label in response to said providing step, and executing at least one command by said neural network in response to at least said value of said at least one label.

In accordance with another aspect of the invention, a method and apparatus are provided for interfacing between a data processing application and a neural network by providing at least one label by said data processing application to an interface arrangement, selecting a procedure including at least one of a translation, truncation and mapping of at least a value corresponding to said at least one label provided by said application, performing said at least one of a translation, truncation and mapping of at least a value corresponding to said at least one label, and applying bits developed by said performing step to predetermined inputs of said neural network.

In accordance with a further aspect of the invention, an output of said neural network including a certainty value is filtered in accordance with a user specified certainty threshold value corresponding to an action to be controlled.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
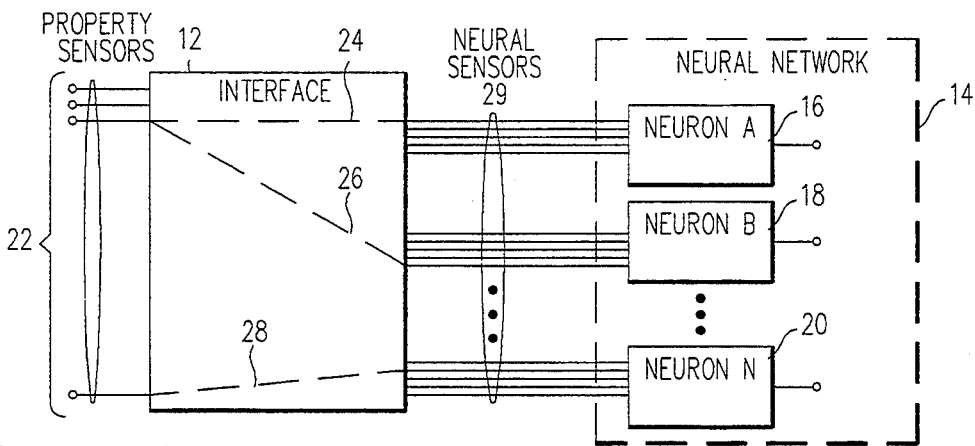
FIG. 1 is a schematic diagram of the connection of the interface according to the invention with the neural circuits of a neural network.

Referring now to FIG. 1, a connection of the interface 12 according to the invention to neurons 16, 18, 20, of a neural network 14 is shown. While the present invention is specifically directed to neurons of the type described in the above- incorporated application entitled Convolutional Expert Neural System (ConExNS), all neural circuits share the characteristic of being responsive to a plurality of input stimuli applied to predetermined, respective ones of those inputs (e.g. neural sensors) and which will be referred to hereinafter as an input vector. That is, a predetermined stimulus must always represent a predetermined component of the input vector although the initial correspondence between any particular stimulus and a particular input vector component is arbitrary.

In the past, this assignment of each stimulus to a particular input of a neural circuit has been done by the user or operator. Therefore, the basic function of any interface must be to automate the assignment and maintenance of the association of a particular stimulus with a particular input of ones of the plurality of neural circuits of the neural network, as depicted by dashed lines 24, 26, 28 of FIG. 1. It is important to note that each stimulus is applied to a consistent, but not necessarily corresponding input of one or more neurons. As illustrated, each stimulus need not be provided to each neuron and a stimulus may be provided to a plurality or even all of the neurons 16, 18, 20.

It should be noted that one of the distinctions of the ConExNS neuron from other types of neural circuits known in the art is the ability to provide an output of a quantized internal certainty value which represents the degree of certainty with which a neuron expresses an output based on the degree of similarity of a current input vector and previously stored input vectors and whether or not the vector is already in memory, regardless of similarity to other memorized input vectors. That is, the ConExNS neuron is able to exhibit so-called "fuzzy logic" and express a value reflecting the certainty of the output. The interface according to the present invention is arranged to exploit this property by externally imposing a certainty threshold as a filter on the output of the neural network relative to the internal certainty value expressed by the neuron. Accordingly, it is to be understood that the interface according to the present invention can control more than the association of stimuli and inputs to neural circuits. However, although the interface according to the present invention can control the association between stimuli and inputs as well as other functions to fully control the ConExNS neuron, the invention is not limited to application to the ConExNS neuron but is applicable to all neural networks, regardless of the type of neural circuit employed therein and the types of decision information available from such neural circuits.

Before proceeding with a detailed description of the invention, it may be useful to consider a simple practical application of a neural network in order to appreciate the ultimate function desired from the neural network and the manner in which the present invention facilitates the obtaining of that function. For example consider a computer network on which electronic mail may be sent from one user to another. On receipt of such mail a user may wish to take one or more actions in dependence on characteristics of the mail. The received item, itself will contain a number of pieces of information on which the decision could be based. For instance, the mail could consist of an informal note, a formal letter, or a document representing a work product or containing desired information. The mail will also have a length and format which may or may not indicate the nature of the mail item. The mail will also have an addressor which may indicate a degree of urgency for response. The mail item also may or may not contain certain words, numbers or terms of interest to the user which may affect the action which the user may desire to take. Certain classifications of the mail item may also be explicitly provided in the mail item which the user may wish to use in making a decision as to the action to be taken in regard to such a mail item.

In a more general sense, the mail item may be considered simply as an "object" on which any of a wide variety of actions could be taken, both procedurally or substantively. For instance, in the example of computerized mail, the user may wish to take substantive action immediately or may wish to assign a priority for substantive action in the future. The user may wish to simply file it or append it to another file and flag the entire file for further consideration. The user may consider the length of a particular type of letter or note or the number of carbons sent to other users as an indicator of the relative importance of the letter or note. If the information is personal or confidential, the user may wish to password protect a file containing the object immediately and defer substantive consideration to some future time. These and other possible characteristics of an object, on which an action decision may be based will be referred to hereinafter as "properties".

In such a system, the ability to send and receive mail or to perform other system functions will be provided by a particular program running of the system or individual terminals thereof, which will hereinafter be referred to as an application. The application will, therefore, be able to recognize its own functions and internal codes and also impose desired structures on the information handled by the application. In using the application, such as responding to the receipt of mail from another user, the user must at least cursorily review the contents of a mail item in order to determine what action to take. The time required for such an review represents an interruption of the work flow of the user and leads to inefficiency since the user must review the matter even if no substantive action is taken. For instance, it might take a considerable amount of time to determine if the object would require an amount of time for substantive action which is not immediately available. Then, the user would be require to cease work on the object and return to other work, requiring a repetition of the review when the object is later considered. Not only is such as circumstance an inefficient use of the user's time but represents an inefficiency of the application.

Therefore, one contemplated use of a neural network is to automate the evaluation of objects in a manner which simulates the user's own responses to similar objects. Such an automatic evaluation of objects represents an enhancement of the application since it reduces the number of actions which the user must affirmatively take (e.g. user commands to the application). For instance, if a user typically calls for printing of a copy of each incoming message but typically prints informal notes on plain paper and prints letters on letterhead (which may be locally generated), a neural circuit could differentiate between such types of communication and direct each to a different printer. As another example, a user might typically print a particular category of document, such as a note, or a document of less than a predetermined length on a local printer and forward other documents to a high-speed central printer, and such types of actions could easily be performed automatically by a neural network. Similarly, a neural network could be used to prioritize responses or provide password protection to certain objects just as the user would have done.

However, as pointed out above, the developing of an array of neurons to associate particular properties of each of a plurality of objects and actions to be taken is extremely difficult at the neural network level, particularly in view of the forms such properties can take, as pointed out above, even though, once established, the neural network will develop an association of specific values of properties and particular actions with little further input from the user.

Figure 2:
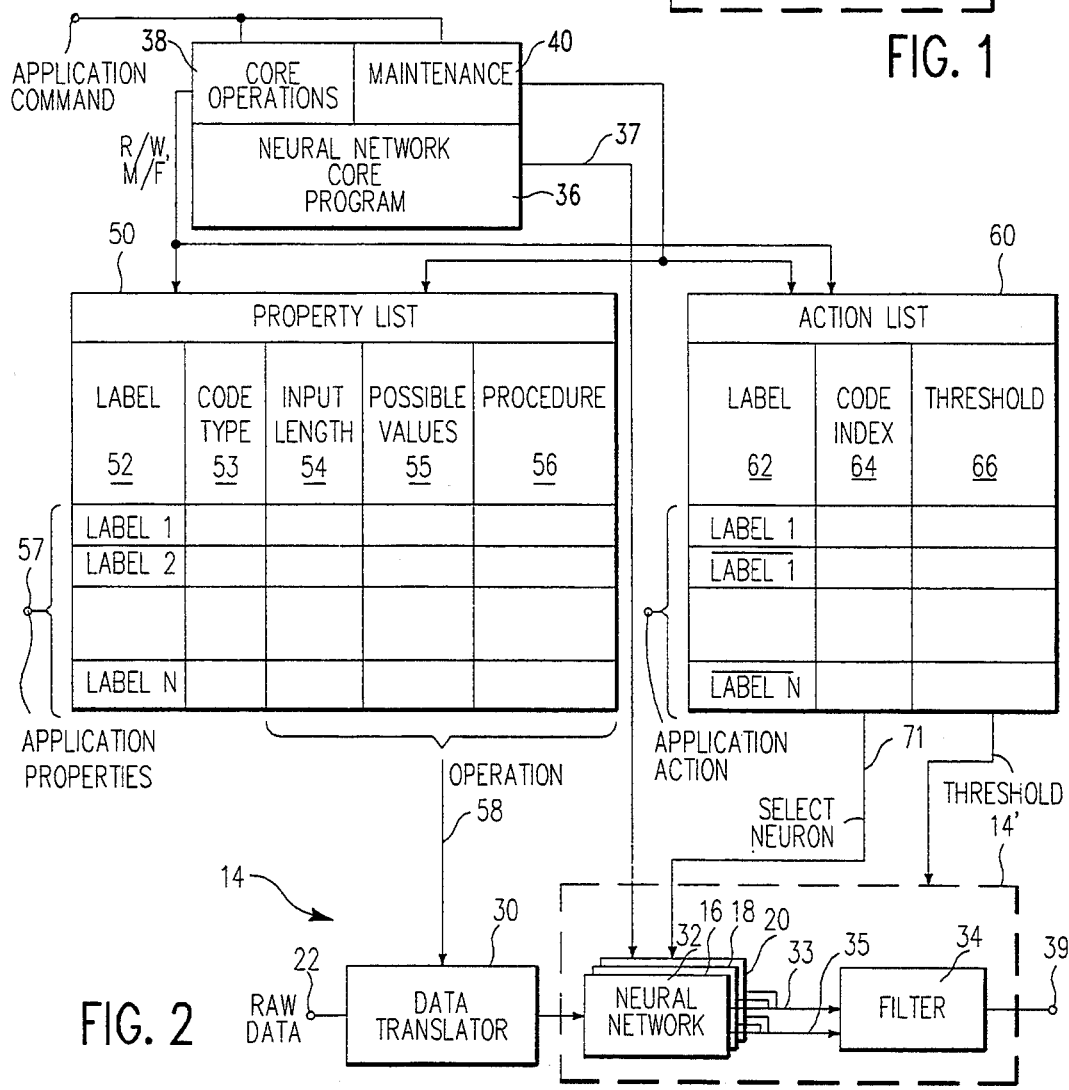
FIG. 2 is a schematic diagram of the organization of the interface in accordance with the present invention.

Referring now to FIG. 2, the basic architecture of the interface according to the invention is schematically shown. Neurons 16, 18, 20 of neural network 14 of FIG. 1 are collectively depicted by dashed line 14' with the distinct logical decision 33 and certainty level output 35 threshold filtration being separately depicted. The functions of the logical decision and filtering of the output based on a desired certainty threshold are shown by blocks 32 and 34, respectively. These elements, together with data translator 30 make up the data path from the stimulus input 22 and neural network output 39.

When the neural network is implemented on a general purpose computer, a core program 36 is used to establish the architecture of each individual neuron regardless of whether or not an interface is used, as depicted by connection 37. The core program 36 is preferably modified, in accordance with the invention, as will be discussed below.

The three basic elements 30, 32, 34 of the data path from stimulus input 22 to neural network output 39 are each controlled by the interface according to the invention. On a most basic level, the particular connections 24, 26, 28 of FIG. 1 are controlled in accordance with an entry in the property list 50, invoked in accordance with a label 52 under control of an application which is running on the computer as indicated by connection 57. This property list basically contains data indicating a correspondence between the nature of outputs of ones of a plurality of sensors and particular, predetermined, inputs to a neural network. In accordance with a preferred embodiment of the invention, however, connections 24, 26, 28 of FIG. 1 may be comprised of several stages or levels of mapping of stimulus inputs 22 onto neural sensors 29.

Specifically, at a first level, for each particular decision to be made, inputs will be mapped onto one or more neurons. On another level, a code conversion is made from whatever type of stimulus exists, to one or more of a plurality of binary bits in a predetermined format. On yet another level, any array of a plurality of stimulus inputs can be rearranged or mapped onto another array of stimulus inputs as either raw data, binary signals or both, as will be described in more detail below, with reference to FIGS. 4 and 5.

In accordance with the invention, the neural network core program 36 used in connection with the ConExNS neuron is modified by the inclusion of some further basic operations and the provision of two further sets of operations. The two further sets of operations are depicted as core operations 38 and size maintenance operations 40. Incidentally, it is desirable to provide a core program as well as the interface according to the invention on a general purpose processor regardless of whether or not the neural network is similarly implemented since it is anticipated that the neural network will be used to facilitate and enhance the use of applications programs also being run on the general purpose machine or another general purpose machine connected thereto through a network.

Additionally, in accordance with the invention, the interface includes a property list 50 and an action list 60. Both of these lists are set up and maintained by means of the size maintenance operations 40 which are added to the core program 36 in accordance with the invention. The various functions of the data translator 30 are controlled in accordance with the contents of property list 50, as depicted by connection 58, in response to a property signal or label input from the application. Generation of the label by which entries in the property list are accessed will be discussed below with reference to FIG. 8.

Action list 60 is similar to property list 50 except for the data contained therein and the fact that entries are preferably provided for both labels and complement labels, as shown, which can preferably Correspond to complementary functions such as print and don't print. In this regard, it should be noted that the labels applied to the property and action lists could potentially be the same if a particular action was to be taken based upon a unique set of stimuli. However, in a preferred implementation in a so-called object-based arrangement, labels used to access the action list will be related to actions which can be performed on a particular object and are completely independent of the labels used to access the property list. This is because an object will possess a potentially large number of properties, any group of which might be used as a basis for a particular decision. At the same time there may be a large plurality of actions which could be taken on the object and a corresponding plurality of decisions might be concurrently required. This feature of the interface is useful for several reasons in the ConExNS neuron including retrieval of desired negative responses to particular input vectors which, as disclosed therein, may be stored in different neurons.

Corresponding to each label and complement label 62, which is accessed by the application in the same manner described above in regard to the property list, a code index 64 is provided to control selection of the neuron which will receive data from the data translator. Similarly, a certainty threshold 66 is also provided from the action list in order to control the action of filter 34. The external threshold as implemented here by use of filter 34 should not be confused with internal thresholds used in the decision process in other forms of neural circuits, such as the ConExNS neuron. The threshold employed in accordance with the invention is externally applied to the neuron output and is set by the user and called by the application which provides the action label 62. The threshold may be set in accordance with the severity of the action such as a lower threshold for a print command than for, say, forwarding a received message to other personnel.

Figures 3, 4:
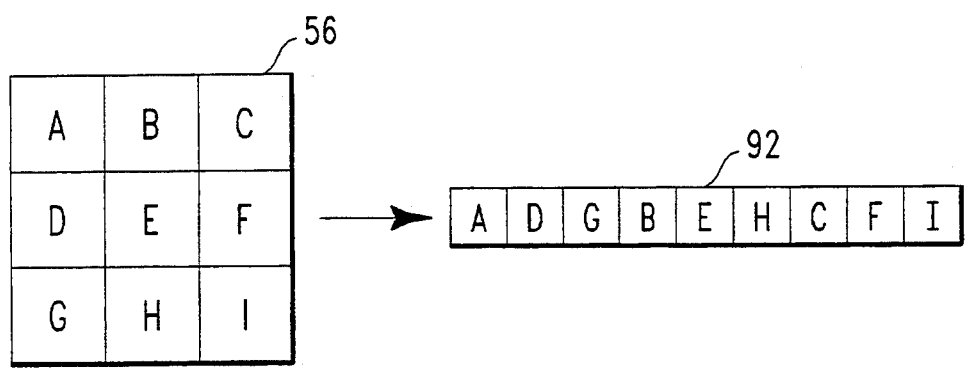
FIG. 3 is an example of the property list of FIG. 2.
FIG. 4 is an example of a data transformation in accordance with one aspect of this invention.

Returning to the property list 50 in more detail and with reference to both FIGS. 2 and 3, several pieces of data are kept for each label. Sample entries are specifically shown in FIG. 3. The discussion that follows will demonstrate how the invention uses these pieces of data to control the various stages of data manipulation which can be done by the data translator. In the following discussion, it should be borne in mind that the various stages of manipulation can be done in any order, as the input data content and format and the hardware or computing overhead require.

Specifically, property list 50 is accessed by an input of a label 52. For each label which is input, a code type 53 will be specified to indicate the type of code which is used to represent the values of the properties of the object. Such codetypes could be of any desired sort, such as Boolean (e.g. binary bits, each of which could be true or false), a number coded in any of a plurality of digital codes, a thermometer code where, in a string of binary digits, the information is coded by a transition position between binary states, categories (e.g. forms established by the application or otherwise discernable from object format or the like), features such as addressor, word content or the like or any other data form (e.g. analog values) that particular values of a property of an object (e.g. an input from a sensor) could take. It should also be noted that the architecture of FIG. 2, while only allowing only a single code type to be associated with each label, can accommodate mixed code types by the simple expedient of permitting multiple entries in the property list 50 to be accessed by a single label. For instance, two or more lines of property list (e.g. LABEL1, LABEL2) could be accessed simultaneously if the labels were made identical. Such multiple accesses allow not only different code types to be assigned (by a portion of procedure entry 56 in property list 50) to different (or even the same) sets of sensor inputs but also allows different possible values, input lengths and procedures to be specified for each codetype. This allows, for instance, a matrix of values (or several matrices of values) to be simultaneously be treated as different types of codes, transformed in different ways, subjected to different truncations and/or ranges comparisons and simultaneously evaluated by different neurons or pluralities of neurons. This facility could be useful in the case of code recognition independent of data content where a given string of code would only yield a recognizable result if decoded in a particular manner.

It should be further noted, in this regard that if the invention is implemented as a so-called object-based system, as is particularly preferred in connection with the object layer interface, incorporated by reference above, that an object will embody a plurality of different properties, any combination of which may form the basis for a decision by the neural network. In such a case, as with mixed codetype or differing procedures, discussed above, a plurality of properties will be accessed from the property list based on a similar plurality of labels corresponding to respective ones of those properties of the object. Therefore, although it is preferable in terms of computing overhead to minimize the number of translations which must be performed (potentially as many as twice (for complementary actions) the product of the number of properties to be considered and the number of possible actions desired to be taken), it is possible that in the course of a particular decision all stimuli, even if null, may be differently translated and applied to every neuron in the neural network and a separate decision thus rendered for every possible action and complementary action that can be taken on a particular object. However, given sufficient computing resources, this capability is indicative of the applicability of the interface to any function which the neural network may be called upon to learn and, eventually, control. This "worst case" scenario, as a practical matter, can also be greatly simplified by recognizing that the order of terms in an input vector is initially arbitrary and a single translation by data translator can be made to serve a large number of neurons. This potential for simplification is indicated by the fact that only one procedure need be provided for a plurality of actions at least represented by complementary actions which would both be decided on the basis of the same properties having data translated in the same way.

To translate each value of a property into a binary value of set of binary values, the property list also specifies, for each label, the possible values 55 which will be recognized. In the most simple case, a Boolean code type will contain only binary values (true or false) which may be directly applied to corresponding inputs of a neural circuit, although some manipulation of format may be used with or without inversion of particular bits in accordance with assigned binary values for each possible value specified for an input, as will be discussed in connection with FIGS. 4 and 5. Generally, other code types require some type of code conversion which is preferably done through the use of comparators which will be further described in connection with FIG. 6. For efficient allocation of resources by the processor, the property list also includes an input length 54 value which corresponds to the number of bits necessary to express the possible values specified for each label by the possible values 55 which the property may have. For instance, if the values are in a boolean code, only 1 bit is required to express the true/false values of the property and "1" is specified for an input length 54 for label "opened" in FIG. 3. Of course other numbers could be specified for other Boolean expressions consisting of two or more bits.

It should be particularly noted that the possible values 55 specified in the property list and the number of bits specified as the input length 54 (referring to the length of the value of the input to be provided to the neuron) not only provides a convenient way to allocate computing resources of the processor but also provides great flexibility for conforming the resolution of the data output from a sensor with the resolution that the neuron is desired to express. For example, for label "note size" a plurality of contiguous ranges of varying size may be provided. For "# of carbons" a plurality of overlapping ranges could be provided. In either case, particular values or restricted ranges of values could be provided as either singular or limited range possible values or as an overlap between ranges. This possibility is also expressed at label "classification" where notes and letters are to be specifically recognized and other formats could either be recognized as, or default to "document". Similarly, specific features might be recognized where a user might wish to apply different flags to communications from his manager and from his co-workers.

Additionally, for each label, the property table provides a procedure 56 which is to be applied to each set of sensor outputs. It is a significant feature of this invention that these procedures may be user defined. These procedures may range in complexity from no transformation, as in a single bit Boolean input, to a plurality of alphabetic or numerical comparisons to reformatting and matrix transformations as might be desired when certain bits of a bit string are to be evaluated and which will now be discussed with reference to FIGS. 4 and 5.

In FIG. 4, a simple matrix transformation is shown as an example of a procedure with may be user specified. In this case, nine values are represented in a 3×3 matrix 90. The particular values in the matrix may be considered as a sequence of values enter row-wise into the matrix. One transformation which might be desired is to develop a bit string 92 by reading out the values from the matrix in a column-wise fashion to yield the sequence ADGBEHCFI, as shown. Such a transformation is useful in the context of the invention since the order of values input to each neural network is significant and, as shown in FIG. 1, a particular input may be applied to each of several neural networks as a different respective term in the input vector of each respective neuron. This type of transformation also allows alteration of weighting of particular inputs at the input stage by permitting one value to be mapped onto a plurality of neuron inputs and another value to be mapped onto a different number of neuron inputs to implement certain filter functions, such as Gabor functions with the neural network. This transformation can also be performed on the data a plurality of times if so specified by procedure 56 of FIG. 3. In any event, the flexibility of reordering the terms of an input vector provides great flexibility in the context of the interface provided by the invention.

Figure 5:
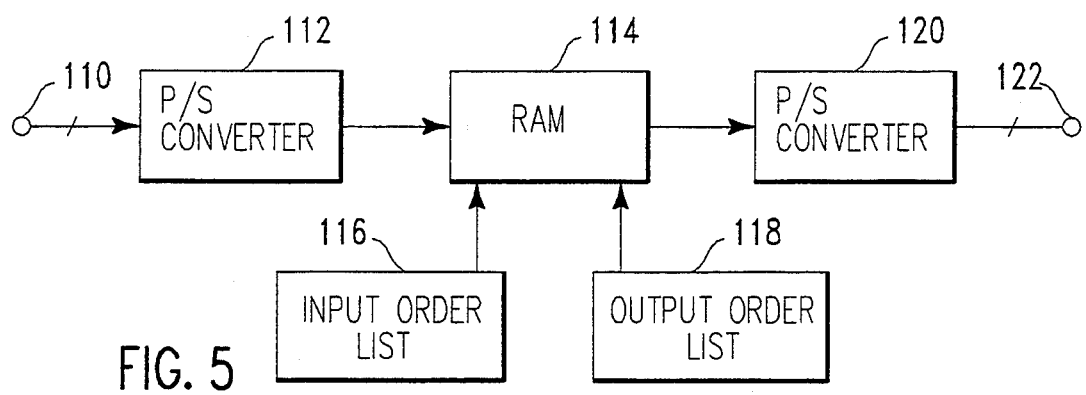
FIG. 5 is a schematic diagram of logic for performing the transformation of FIG. 4 and other transformations.

As an example of an implementation of the transformation of FIG. 4, reference is now made to FIG. 5. A matrix or any other representation of an ordered array of bits may be simulated by placing the bits, received at 110 in a time sequence such as by parallel to serial conversion 112, if necessary, and assigning an address to each value for storage in random access memory 114 by means of an input order list 116. The same addresses that are provided by input order list 116 are also provided by output order list 118 but in an order bearing an arbitrary relation to the order in the input list 116. Thus, any desired transformation can be performed on the order of the values or bits in a multi-valued expression. Again, this type of transformation can be performed a plurality of times and at different levels of the translation provided by data translator 30 of FIG. 2. For instance, such a transformation could be used to encrypt or decipher a category or feature sensor output. Then after truncation in accordance with specified possible values, the bits expressing ones of those possible values can be additionally reordered to correspond to a particular input vector for a particular neuron.

Figure 6:
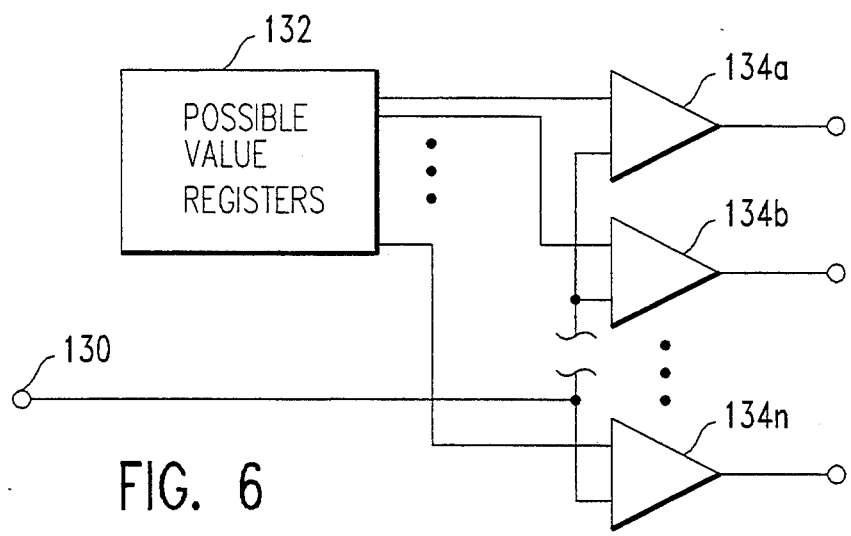
FIG. 6 is a schematic diagram of a digital comparator for truncating data resolution.

Truncation of the sensor output will now be discussed in connection with FIG. 6. In response to the property list being accessed in accordance with a label, possible values 55 that the sensor output may assume are entered into register 132 and are respectively provided as inputs to a number of comparators 134a, 134b, . . . 134n which will correspond in number to the input length value 54. As indicated above, the input length value 54 is particularly useful in setting up the comparator array when the invention is implemented on a general purpose processor since the number of registers to be allocated and the number of comparisons required will both correspond to the input length value 54 and resource of the processor can be allocated accordingly in a manner well-understood in the art.

The function of each comparison (e.g. exact, range, greater than, less than, etc.) is specified by and established in accordance with the procedure definition 56 corresponding to each label of the property table 50. Both character sequence and numerical value comparisons should be available. It should also be noted that an additional numeral transformation such as from a thermometer code to a numerical value, if desired, between input 130 and comparators 134. Of course, inputs to the comparators should be in corresponding codes. Character codes can, of course be readily converted as set out above in accordance with FIGS. 4 and 5. However, it is to be understood that numerical code conversion can also be done on the arguments of possible values 55 and, in any event, the need for numerical code conversion can be avoided altogether by simply storing possible values 55 in the same code as that expected from the sensors.

Figure 7:
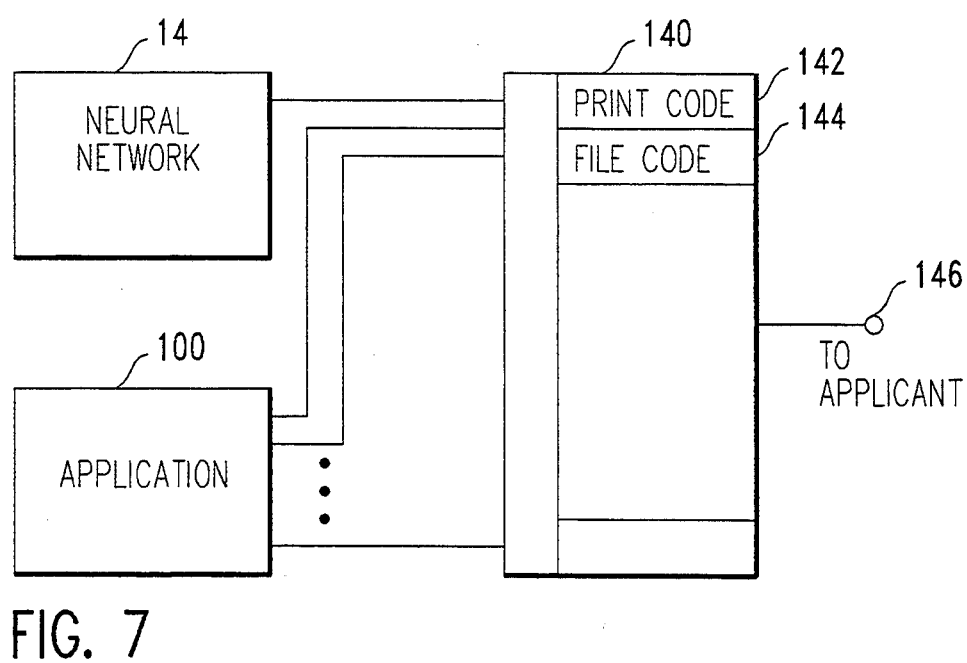
FIG. 7 is a diagram showing an exemplary command translation table for using the neural network output to achieve a desired control response.

In view of the above, it is seen that the use of property table 50 and the particular values therein allows any desired translation, transformation or truncation of raw data to be done as well as reordering of binary bits in accordance with particular input vectors associated with each neuron. With similar access by the application to the action list, data translated, truncated and/or transformed by data translator 30 may be applied to any selected neuron by means of the code index in the action list 60. The output of the neural network can then be filtered in accordance with an externally applied certainty threshold applied to filter 34 from a threshold entry in the action list. In order to use the output of neural network 14 to exert control over the system or application, it is then only necessary to provide a translation of the single binary bit output by the neural network 14 into a command. This is done as shown in FIG. 7. Since the application is capable of recognizing its own internal codes and providing the same to the interface as labels to the property and action lists, a label is also preferably provided from the application to a command list 140 which may be implemented as part of the action table 60. It is preferred that both labels and complement labels be provided to allow for alternative actions and alternative response from plural neurons in the same fashion as was described above. A particular virtue of providing complementary labels for the command list is to allow for automatic prompting for user inputs in response to differing input vectors to each neuron and automatic resumption of control of the function by the neural network when a user specified confidence level is reached by a particular neuron associated with that function. Thus a label or other output from the application can be used to supply all but one of the inputs by which as many command codes 142, 144 as desired may be accessed and output at 146 to the application or system.

Figure 8:
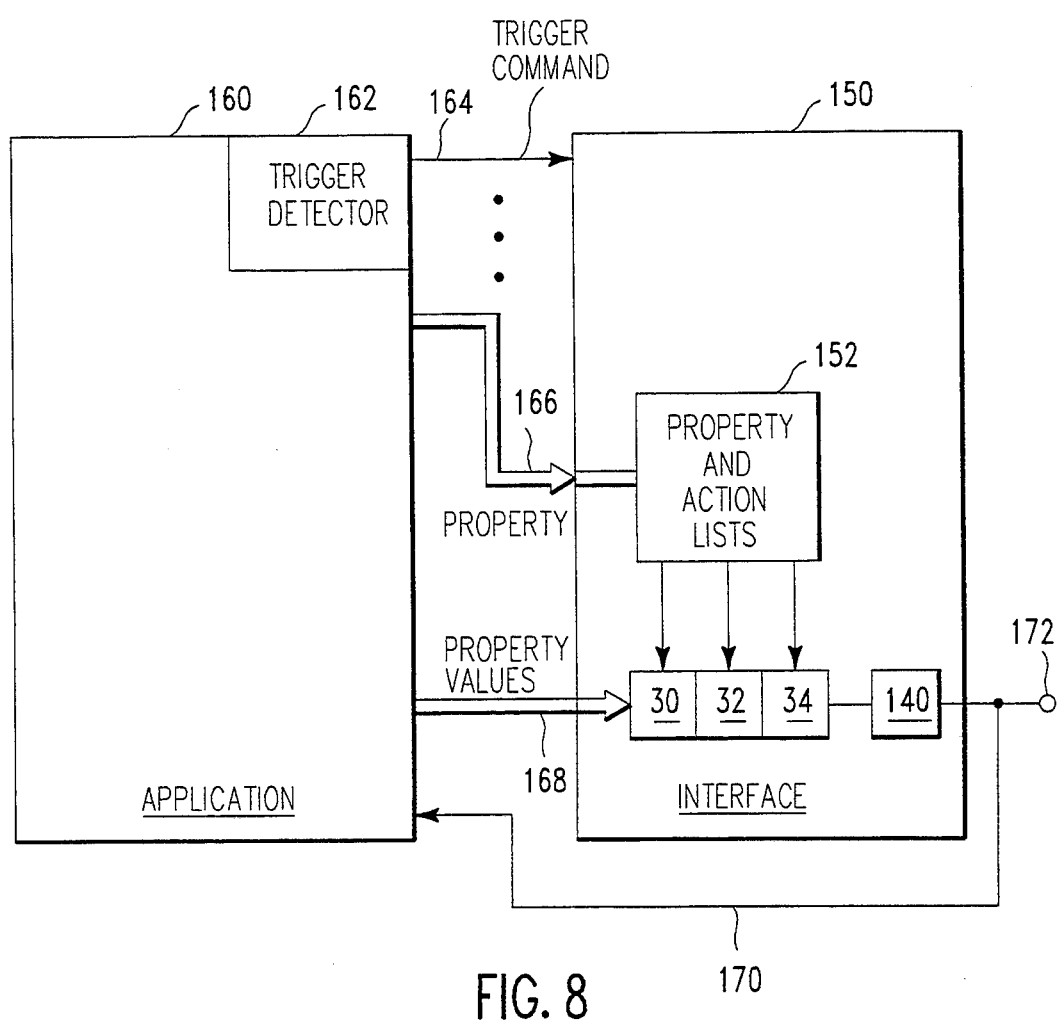
FIG. 8 is a depiction of the derivation of a label for the input, from an application, to the property and action lists of FIG. 2.

Referring now to FIG. 8, the derivation of a label input to the property and action lists will now be discussed. It should be also noted that FIG. 8 illustrates the association of the application and the interface an thus illustrates one preferred application of the invention. It should be noted that the contents of the interface 150 generally corresponds to FIG. 2, including property and action lists collectively indicated at 152. Essentially, under control of the application, whenever an action can be taken on an object the potential exists for the neural network to exercise control of the application, for example: 1.) those occasions when an operator takes an action on an object, which is an opportunity for the neural network to learn, such as when an application sends a "memorize" or "forget" command, or 2.) when the application, itself, calls for a decision from the neural network, such as the application calling for "Decide" "DecideAllActions" and "Recall". In either case, the user or application control of the interface is performed through the application by issuance of a trigger signal over connection 164 to invoke the operation of the neural network. At the same time, the properties associated with object to which the trigger event relates are supplied to the interface as a label to access the property list 50, the action list 60 and the command list 140, if the command list is separately implemented from the Action list 60. The property values (e.g. the sensor outputs) are applied as raw data to the data translator 30, the neural network 32 and the output of the neural network passed through filter 34, each under control of the property and/or action lists as described above. Of course, additional translation of the properties to a label could be provided, but since labels are arbitrary, such translation is not necessary and the codes used within the applications can be directly applied to the property and action lists. In response to the output of the neural network and the label, a signal is output which may be fed back to the application over connection 170 or output to the system or another device as indicated at 172.

It is to be understood that the above arrangement of an interface for a neural network allows any group of signals (e.g. "sensors" which can be or correspond to any signal in the system) to be input to any neuron established in the neural network by core program 36 of FIG. 2. Thus, by mere specification of a code type, input length, possible values, procedure and threshold (code index 64 is preferably assigned by the interface), neurons of a neural network can be established to learn operator responses to any arbitrary condition in the application and, in particular, to circumstance when an action may be taken on an object. Not even all of these particular parameters need be specified if neurons of lesser capability than the ConExNS neuron are employed in the neural network (e.g. threshold). Also, as noted above, the input length is supplied as a preferred form of implementation and is not specifically required, being derivable from the possible values 55.

The neural network, under control of the interface according to the invention, will respond to trigger events automatically and will learn operator responses to combinations of sensor outputs specified for each neuron and, eventually gain the ability to automatically simulate common operator responses when an operator specified confidence threshold is reached. All that is necessary is that the user define the relationship between sensor output or stimuli from the application and the function to be controlled. The neural network will then learn the user's response in the course of normal interaction of the user and the application.

In order to define the relationship between sensor output or stimuli from the application and the function to be controlled, a number of commands are provided which directly control the interface at each of three levels. First, at the system level, four commands are provided (Initialize, Load, Unload and Eliminate). Two of these commands (Load and Unload) are directed to reduction of processor overhead associated with the interface and the neural network. These commands perform the following system maintenance functions:

Initialize
1. Specify name of neural network
2. Evaluate property list to determine sensor size of network
3. Evaluate action list to determine number of neurons in network
4. Call initialize of neural network
   a. assign name to neural network
   b. allocate memory for input and output size of network
5. Return e.g. name to application as confirmation Load
1. Receive data structure from application (in form returned at unload)
2. Strip property list and action list from data structure
3. Store property and action lists in variables
4. Call load of neural network with reduced data structure
   a. store data structure in internal variables
   b. return name to interface as confirmation
5. Return name to application as confirmation Unload
1. Allocate memory for its internal data structure
2. Call unload of neural network
   a. walks through memory to find needed data to save
   b. loads data into allocated structure
   c. returns the structure to the interface
3. Add property list and action list to data structure
4. Return data structure to application Eliminate
1. Deallocate all memory associated with interface
2. Call eliminate of neural network
   a. deallocate all memory associated with interface
   b. return name to interface confirmation
3. Return name to application as confirmation Only certain neural networks are maintained at any given time in accordance with the existence of objects upon which action may be taken. For instance, a mail assistant neural network would be loaded when the in basket of an electronic mail application was opened. These two commands allow for ease of activating and de-activating neural networks without losing their contents and the state to which learning by each neuron has progressed at a given point in time. Additionally, commands are provided to form a neural network for each application and to destroy a named neural network system corresponding to a particular application.

At the size maintenance (40 of FIG. 2) level, given a loaded and initiated neural network, six commands are preferably provided to manipulate the property and action lists. These commands perform the following actions to allocate computing resources and thus maintain the size of the neural network:

AddProperty
1. Add a new record to property list
2. Assign label, value, etc. to new record
3. Calculate input size in bits for new property
4. Calculate total current size of inputs (for index)
5. Call insert input of neural network
   a. allocate new memory for new inputs
   b. return to interface for confirmation
6. Return to application for confirmation RemoveProperty
1. Calculate index and size of property in neural network
2. Remove record of property from property list
3. Call remove input of neural network
   a. deallocate memory for input size at index
   b. reindex remaining inputs
   c. return to interface for confirmation
4. Return to application for confirmation InsertPropertyValue
1. Find record in property list with label
2. Add value to list of possible values
3. Calculate an index position based on new value list
4. Call insert input of neural network
   a. allocate memory for new index
   b. reindex remaining inputs
   c. return to interface for confirmation
5. Return to application for confirmation InsertAction
1. Add a new record to action list
2. Assign label, threshold, etc. to new record
3. Calculate total current size of outputs (for index)
4. Call insert output of neural network
   a. allocate new memory for new output (neuron)
   b. return to interface for confirmation
5. Return to application for confirmation RemoveAction
1. Calculate index of action in neural network
2. Remove record of action from action list
3. Call remove output of neural network
   a. deallocate memory for output at index
   b. reindex remaining outputs (neurons)
   c. return to interface for confirmation
4. Return to application for confirmation ChangeAction - relates to ext threshold
1. Find record in action list with label
2. Change threshold of action
3. Return to application for confirmation In order for the user to exercise control over the learning process and the use of the memory of the neural network, an additional five commands are provided at the core operation (38 of FIG. 2) level. These five commands correspond to basic functions of the neural network as follows:

Memorize
1. For each value, translate value to bit string according to property
2. Calculate output index for specified action
3. Call memorize of neural network
   a. clamp bit string to inputs of indexed output (neuron)
   b. write input to neuron
   c. return to interface for confirmation
4. Return to application for confirmation Forget
1. For each value, translate value to bit string according to property
2. Calculate output index for specified action
3. Call forget of neural network
   a. clamp bit string to inputs of indexed output (neuron)
   b. erase input to neuron
   c. return to interface for confirmation
4. Return to application for confirmation Decide
1. For each value, translate value to bit string according to property
2. Calculate output index for specified action
3. Call decide of neural network
   a. clamp bit string to inputs of indexed output (neuron)
   b. read output of neuron
   c. return output to interface
4. Compare return value to threshold to calculate difference
5. Return action label and difference (confidence/risk) to application DecideAllActions
1. For each label in action list, call decide
2. Store returned labels and differences in memory
3. Return stored labels and difference to application Recall
1. For each value, translate value to bit string according to property
2. Calculate output index for specified action
3. Call recall of neural network
   a. clamp bit string to inputs of indexes output (neuron)
   c. return list of best matches in memory to interface
4. Translate bit string matches into value lists
5. Return value lists to application As will be understood by those skilled in the art, the above descriptions of the operations which are performed at respective levels of the interface according to the invention are quite basic and will enable programmers to produce program code suitable to enable practice of the invention. It will also be recognized that the above operations which include steps which have a call of a further operation, the further operation is one which usually involve the allocation of resource on the level of the machine and will be carried out at a level below that of the interface such as by the low-level bit interface, incorporated by reference, above.

Figure 9:
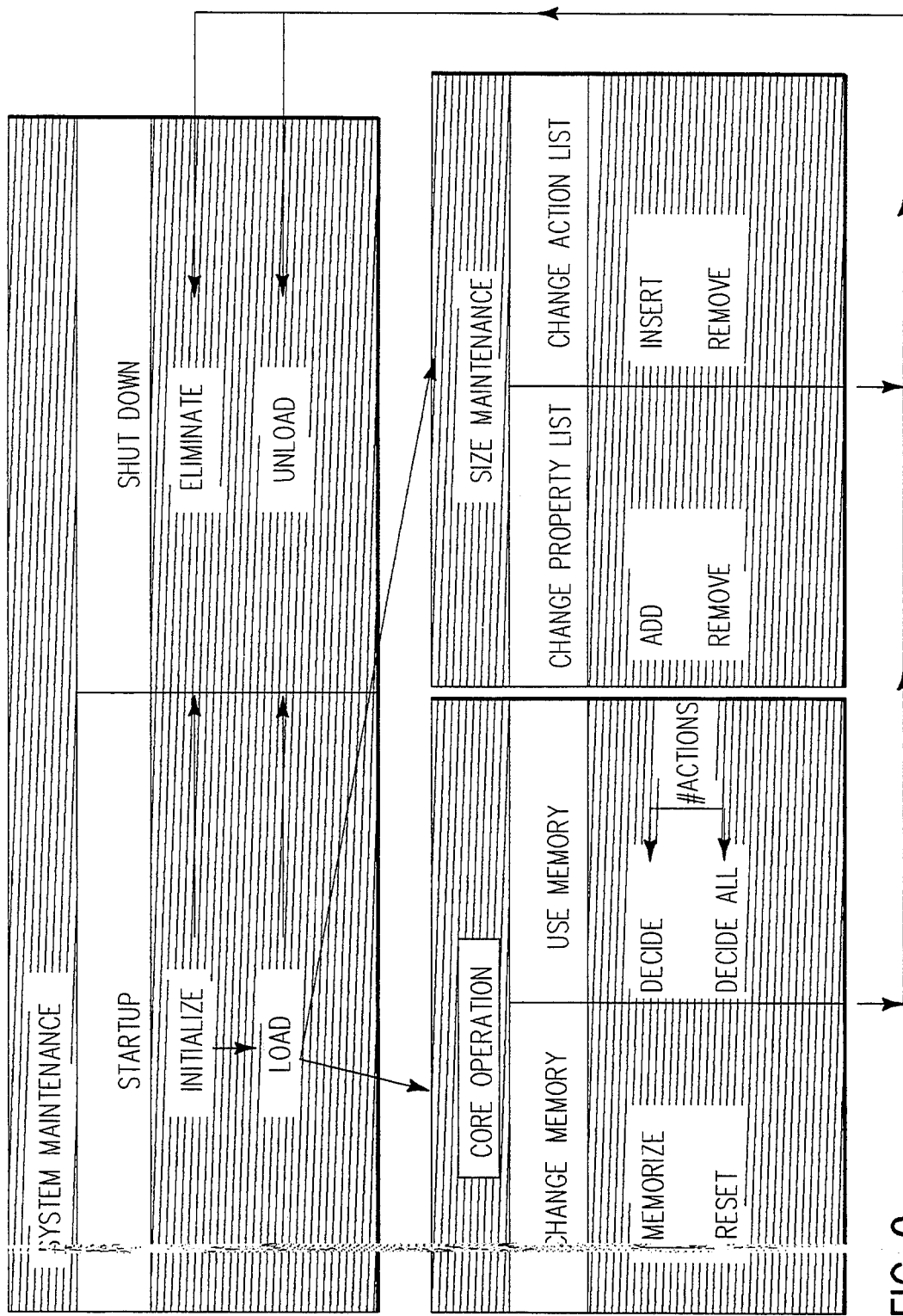
FIG. 9 is a state diagram illustrating the operation of the present invention

In summary of the operation of the invention, and with reference now to the state diagram of FIG. 9, it is seen that the first time the interface is used for each application which may be available on a particular processor or network, the interface must be initialized. This operation basically corresponds to the creation of a directory corresponding to each application for storage of neural network parameters. Once this is done, the operation can be undone at any time under user control.

In dependence on the application and the existence of objects therein, from time to time, the neural network is loaded, either automatically or under operator control. Once loaded, it can be unloaded from time to time and reloaded as necessary to minimize processor and memory overhead. While loaded, however, the operator may manipulate lists by performing the size maintenance operations described above or control learning of the neural network through the core operations described above. As before, anything done can be undone by looping to unload or eliminate. For example, the procedure or possible values entry corresponding to a particular label in the property list may contain a critical date. Once that value could no longer be satisfied, that procedure or possible value would be eliminated either by automatic action of the interface or by user intervention.

In view of the above detailed description of the preferred embodiment of the invention, it is seen that the enhanced interface in accordance with the present invention allows the user to easily define the nature and parameters of each neuron of a neural network and arbitrary control of input mapping, translation, truncation or other input transformation which may be wholly or partly user defined.

While the invention has been described in terms of a single preferred embodiment, those skilled in the art will recognize that the invention can be practiced with modification within the spirit and scope of the appended claims.

Having thus described my invention, which I claim as new and desire to secure by Letters Patent is as follows:

1. A method of interfacing between a data processing application and a neural network including the steps of
    providing at least one label by said data processing application to an interface arrangement, wherein said label corresponds to an action which can be taken on an object of said application,
    selecting, in accordance with said label, a neuron of said neural circuit from a list, said list containing at least an index of said neuron, for application of a value of said at least one label in response to said providing step, wherein said index of said neuron corresponds to said action, and
    executing at least one command by said neural network in response to at least said value of said at least one label.

2. A method as recited in claim 1, wherein said command is defined by a user by providing an entry in a list in accordance with a label.

3. A method as recited in claim 2, wherein said label corresponds to an action which can be performed on a object in said data processing application.

4. A method as recited in claim 2, including the further step of deleting an entry in said list.

5. A method as recited in claim 2, including the further step of adding an entry to said list.

6. A method of interfacing between a data processing application and a neural network including the steps of
    providing at least one label by said data processing application to an interface arrangement, wherein said label corresponds to an action which may be taken on an object of said application,
    selecting, in accordance with said label, a neuron of said neural network, from at least one list accessible in accordance with said label, said at least one list containing at least an index of said neuron corresponding to said action, and a certainty threshold value and procedure including at least one of a translation, truncation and mapping of at least a value corresponding to said at least one label provided by said application,
    performing said at least one of a translation, truncation and mapping of at least said value corresponding to said at least one label to develop bits,
    applying bits developed by said performing step to predetermined inputs of said neural network, and
    filtering an output of said neuron in accordance with a certainty threshold selected in said selecting step.

7. A method as recited in claim 6, wherein said procedure is defined by a user by providing an entry in a list in accordance with a label.

8. A method as recited in claim 7, wherein a property corresponds to said label.

9. A method as recited in claim 6, including the further step of deleting an entry in said list.

10. A method as recited in claim 6, including the further step of adding an entry to said list.

11. A method of operating a neural network including the steps of
    obtaining an output and a certainty value from a neuron in said neural network, said neuron selected from a list containing at least an index of a neuron of said neural network in accordance with a label provided by an application, said label corresponding to an object on which an action may be taken an wherein said index of a neuron identifies a neuron corresponding to said action,
    obtaining a certainty threshold value in response to a label in a data processing application, and
    filtering said output of said neuron in response to a comparison of said certainty value and said certainty threshold value.

12. A method as recited in claim 11, including the further step of specification of said certainty threshold value by a user.

13. A method as recited in claim 11, wherein said certainty threshold value is obtained from a list in accordance with said label.

14. An interface arrangement between a data processing application and a neural network including
    means for providing at least one label by said data processing application to said interface arrangement,
    at least one list accessible in accordance with said label, said label corresponding to an object in said application on which an action may be taken, said list containing at least an index of a neuron in said neural network corresponding to said action,
    means for selecting a confidence threshold and at least one of a procedure and an action, said procedure including at least one of a translation, truncation and mapping of at least a value corresponding to said at least one label provided by said application,
    means for performing said at least one of an action based on at least one value corresponding to said at least one label and a translation, truncation and mapping of at least a value corresponding to said at least one label,
    means for applying said at least one value corresponding to said label to predetermined inputs of said neural network, and means for filtering an output of said neural network in accordance with said certainty threshold corresponding to said label.

15. An interface as recited in claim 14, wherein said label further corresponds to a property of an object and said list contains data indicating correspondence between an output of at least one sensor and an input of said neural network.

16. An interface as recited in claim 14, wherein said list contains a certainty threshold value corresponding to said action.

17. An interface as recited in claim 14, further including
means for changing said at least one list by at least one of adding and deleting entries therein.

18. An interface as recited in claim 17, wherein said means for changing said at least one list is controlled by a user.

* * * * *